United States Patent [19]

Staerzl

[11] Patent Number: 4,750,464
[45] Date of Patent: Jun. 14, 1988

[54] MASS FLOW FUEL INJECTION CONTROL SYSTEM

[75] Inventor: Richard E. Staerzl, Fond du Lac, Wis.

[73] Assignee: Brunswick Corporation, Skokie, Ill.

[21] Appl. No.: 25,270

[22] Filed: Mar. 12, 1987

[51] Int. Cl.$^4$ ............................................. F02M 51/00
[52] U.S. Cl. .................................. 123/494; 73/118.2; 73/861.02
[58] Field of Search ........... 123/494; 73/118.2, 119 R, 73/861.02, 861.03; 364/510, 558

[56] References Cited

U.S. PATENT DOCUMENTS

| | | | |
|---|---|---|---|
| 3,884,195 | 5/1975 | Murtin et al. | 123/485 |
| 4,010,645 | 3/1977 | Herzl | 73/861.03 |
| 4,050,878 | 9/1977 | Priegel | 123/494 X |
| 4,131,088 | 12/1978 | Reddy | 123/494 |
| 4,216,673 | 8/1980 | November | 73/861.03 X |
| 4,250,745 | 2/1981 | Blatter et al. | 123/494 X |
| 4,264,961 | 4/1981 | Nishimura et al. | 123/494 X |
| 4,280,465 | 7/1981 | Staerzl | 123/494 |
| 4,290,394 | 9/1981 | Frank et al. | 123/73 A |
| 4,305,351 | 12/1981 | Staerzl | 123/73 A |
| 4,349,000 | 9/1982 | Staerzl | 123/491 |
| 4,391,254 | 7/1983 | Staerzl | 123/478 |
| 4,391,255 | 7/1983 | Staerzl | 123/481 |
| 4,401,085 | 8/1983 | Staerzl | 123/488 |
| 4,429,673 | 2/1984 | Staerzl | 123/491 |
| 4,502,325 | 3/1985 | Klomp | 73/861.02 X |
| 4,523,572 | 6/1985 | Staerzl | 123/494 |
| 4,549,517 | 10/1985 | Kamiyama | 123/478 |
| 4,562,744 | 1/1986 | Hall et al. | 73/861.02 |
| 4,617,892 | 10/1986 | Staerzl | 123/352 |
| 4,637,261 | 1/1987 | Kraus et al. | 73/118.2 |
| 4,644,474 | 2/1987 | Aposchanski et al. | 123/494 X |

Primary Examiner—Willis R. Wolfe
Attorney, Agent, or Firm—Andrus, Sceales, Starke & Sawall

[57] ABSTRACT

A mass flow fuel injection control system is provided for an internal combustion engine and measures mass and flow velocity of combustion air. The length of fuel injection pulses is determined by $\sqrt{P_D P_A / T}$, where $P_D$ is the air pressure drop produced by a venturi (32), $P_A$ is absolute air pressure, and T is air temperature. The system directly determines fuel requirements from the air mass flow and automatically self-adjusts and tracks such requirements from engine to engine or with modifications to the engine, without a preprogrammed look-up table according to throttle setting, and eliminates the need for a throttle position sensor.

27 Claims, 3 Drawing Sheets

MASS FLOW FUEL INJECTION CONTROL SYSTEM

BACKGROUND AND SUMMARY

The invention relates to an electronic fuel injection control system for an internal combustion engine. The system senses both the mass and flow velocity of combustion air for the engine and accordingly controls the amount of fuel injected, without determination from a preprogrammed look-up table according to throttle setting. The invention eliminates the need for a throttle position sensor. The use of air mass and air flow velocity is called a mass flow system.

In a fuel injected engine, it is necessary to know the amount of air going into the engine in order to determine the amount of fuel to be injected, in order to provide the proper air-fuel ratio mixture. In a speed density system, for example as shown in my prior U.S. Pat. No. 4,305,351, hereby incorporated herein by reference, the amount of air going into the engine is determined indirectly by knowing ahead of time the typical amount of air entering the engine for a given throttle setting. The fuel requirements are then programmed in a look-up table memory. This type of system works well if the engine is a constant. However, if the engine is altered, then the look-up table for the fuel requirements must be reprogrammed. This is particularly objectionable in racing applications where the engine may be changed from day to day, or race to race, by providing different compression ratios, cylinder heads, camshafts, etc. The look-up table does not self-correct or automatically track the particular engine at hand.

It is common in marine racing applications to change cylinder heads, seeking higher compression ratios. This changes the operating and horsepower characteristics of the engine, and in turn requires that the speed density system be recalibrated in order to achieve optimum performance. In addition, it has been found in racing applications that the throttle position sensor has a very short life rating. With the high stresses and shock loading typical in racing, particularly on engines running close to 10,000 rpm, it is not uncommon for throttle position sensors to fail within a half hour. It is not unusual to replace the throttle position sensor after every race.

The present invention arose out of marine racing applications, though it is not limited thereto. The invention senses air flow velocity and air mass to control the amount of fuel injected, without determination from a preprogrammed look-up table according to throttle setting. The invention overcome the above noted problems regarding reprogramming and recalibration upon alteration of the engine or use on different engine. The invention also eliminates the need for a throttle position sensor, overcoming the above noted reliability problem.

The present invention provides a mass flow system which determines the amount of air coming into the engine by means of its velocity and mass. With this information, it is known how much fuel the engine needs. The system automatically tracks and self-adjusts to the particular engine at hand, and can be used on an altered engine or on another different engine, and will automatically readjust to the engine's fuel requirements, all without a look-up table. The automatic tracking is also desirable as the engine wears. As piston rings wear, the piston will pull in less air, and the electronic fuel injection control system will automatically lower the amount of fuel injected. Without this automatic adjustment, the fuel-air mixture would become richer.

One manner known in the prior art for measuring air flow is to use a hot film or a hot wire. The denser the air moving by the film, the more heat will be removed from the film. Also, the faster the air moves by the film, the more heat will be removed. The amount of energy needed to maintain a constant temperature of the film is measured, to indicate the amount of heat being pulled off by the air flowing by the film. A drawback of the hot film is that it is a very fragile device. Another problem is that the film must be relatively free of contamination. If there is dirt on the film, the dirt will act as an insulator and will change the measurement. It has also been found that water in the air stream dramatically adversely affects the hot film. Water is much denser than air, and extracts more heat. In marine applications, it is nearly impossible to keep water out of the engine, and hence such system is not suitable therefor.

Another approach known in the prior art for measuring air flow is to use a flapper valve. A spring loaded valve in the air stream is deflected by the air flow, and the amount of deflection measures the air flow. The disadvantage of this approach is that the flapper valve is in the air stream and blocks some of the air, acting like a throttle and reducing maximum horsepower. It has also been found that in rough water applications, the flapper may start oscillating or may even break off because of the shock loads experienced in racing. The rugged environment of marine racing thus rules out the flapper valve approach.

In the present invention, flow velocity of combustion air is measured by sensing air pressure drop across a venturi in the air intake manifold, and the mass of combustion air is measured by sensing air pressure and temperature.

DETAILED DESCRIPTION

Figure 1:
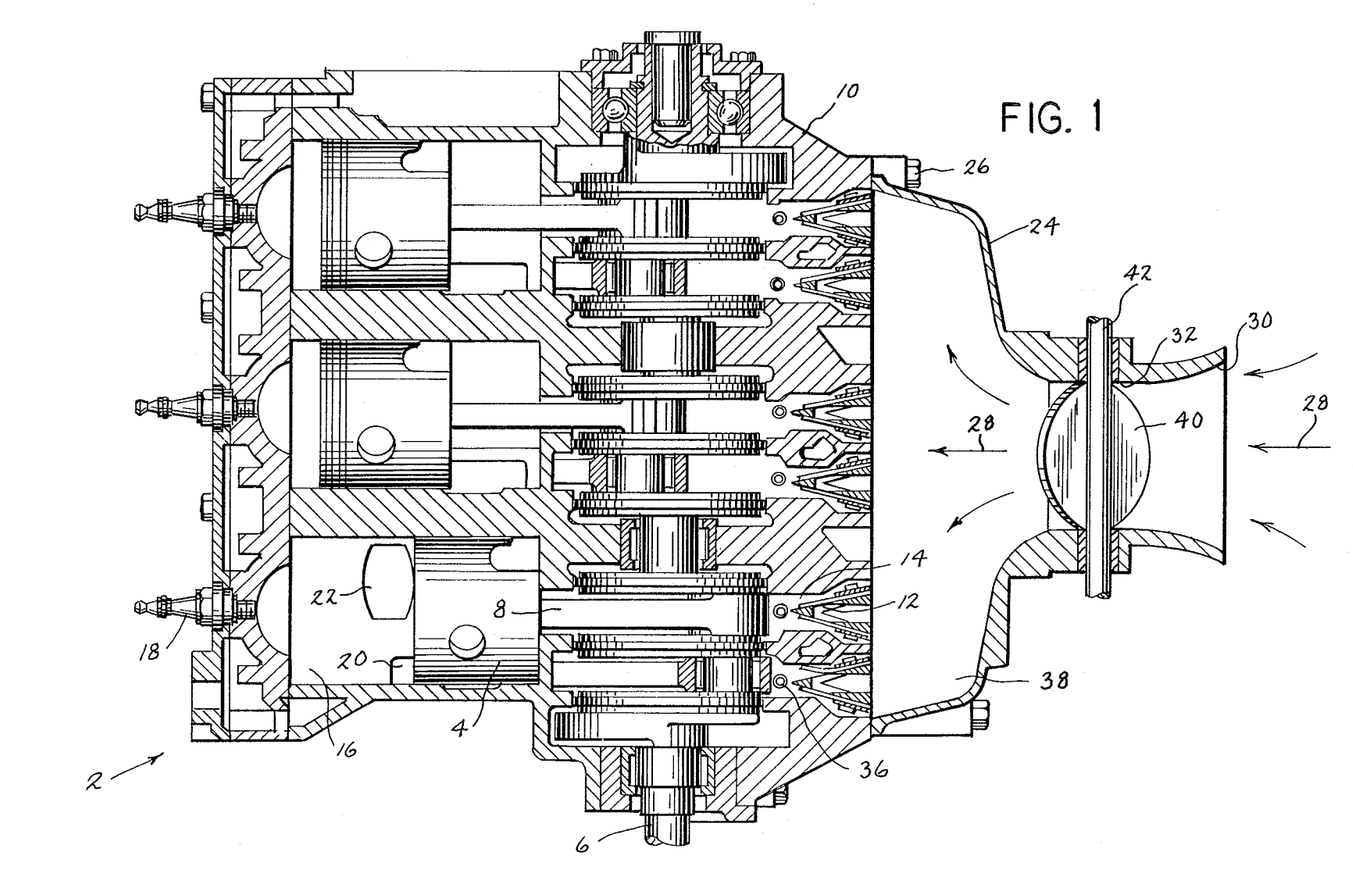
FIG. 1 is a sectional view through one of the cylinder banks of a V-6 marine internal combustion engine and control system in accordance with the invention.

FIG. 1 shows a two cycle internal combustion engine 2 having a plurality of reciprocal pistons 4 connected to a vertical crankshaft 6 by connecting rods 8 in a cylinder block 10. FIG. 1 shows one bank of three cylinders in a V-6 engine. Piston 4 moves to the left during its intake stroke drawing a fuel-air mixture through one-way reed valves 12 into crankcase chamber 14. Piston movement to the left also compresses the fuel-air mixture in cylinder 16 for ignition by spark plug 18, which combustion drives piston 4 to the right generating its power stroke. During the movement of piston 4 to the right, the fuel-air mixture in crankcase chamber 14 is blocked by one-way reed valves 12 from exiting the crankcase and instead is driven through a transfer passage in the crankcase to port 20 in cylinder 16 for compression during the intake stroke, and so on to repeat the cycle, all as is well known. The combustion products are exhausted at port 22.

Air intake manifold 24 is mounted by bolts 26 to crankcase 10 and defines the air intake flow path as shown at arrows 28. The manifold includes an outer mouth 30 and a reduced inner diameter portion 32 providing a venturi through which the air flows. Fuel is injected into the crankcase downstream of the reed valves, for example as shown in incorporated U.S. Pat. No. 4,305,351 at fuel injectors 34 in FIGS. 2 and 3. The fuel injector tips are shown at 36. Alternatively, the fuel may be injected in plenum 38 upstream of the reed valves. Venturi 32 includes a butterfly valve 40 on rotatable shaft 42 for controlling air flow into manifold 24. Manifold 24 has a drilled passage 44 therethrough, FIG. 2, at venturi 32 which receives a tube 46 for sensing pressure at venturi 32. Manifold 24 has another drilled passage 48 therethrough at outer mouth 30 which receives a tube 50 for sensing pressure thereat. As air flows through venturi 32, there is a pressure drop according to Bernoulli's principle. Tube 46 is open at its end 45 and senses the reduced pressure in venturi 32. Tube 50 senses the absolute pressure outside of the venturi. Tube 50 is closed at its end 47 and has a small hole in its side 49 facing upstream. When butterfly valve 40 is closed, it is at an angle of approximately 30° relative to a plane normal to air flow path 28. Tube 46 is adjacent shaft 42 and upstream of valve 40.

Figures 2, 3, 5:
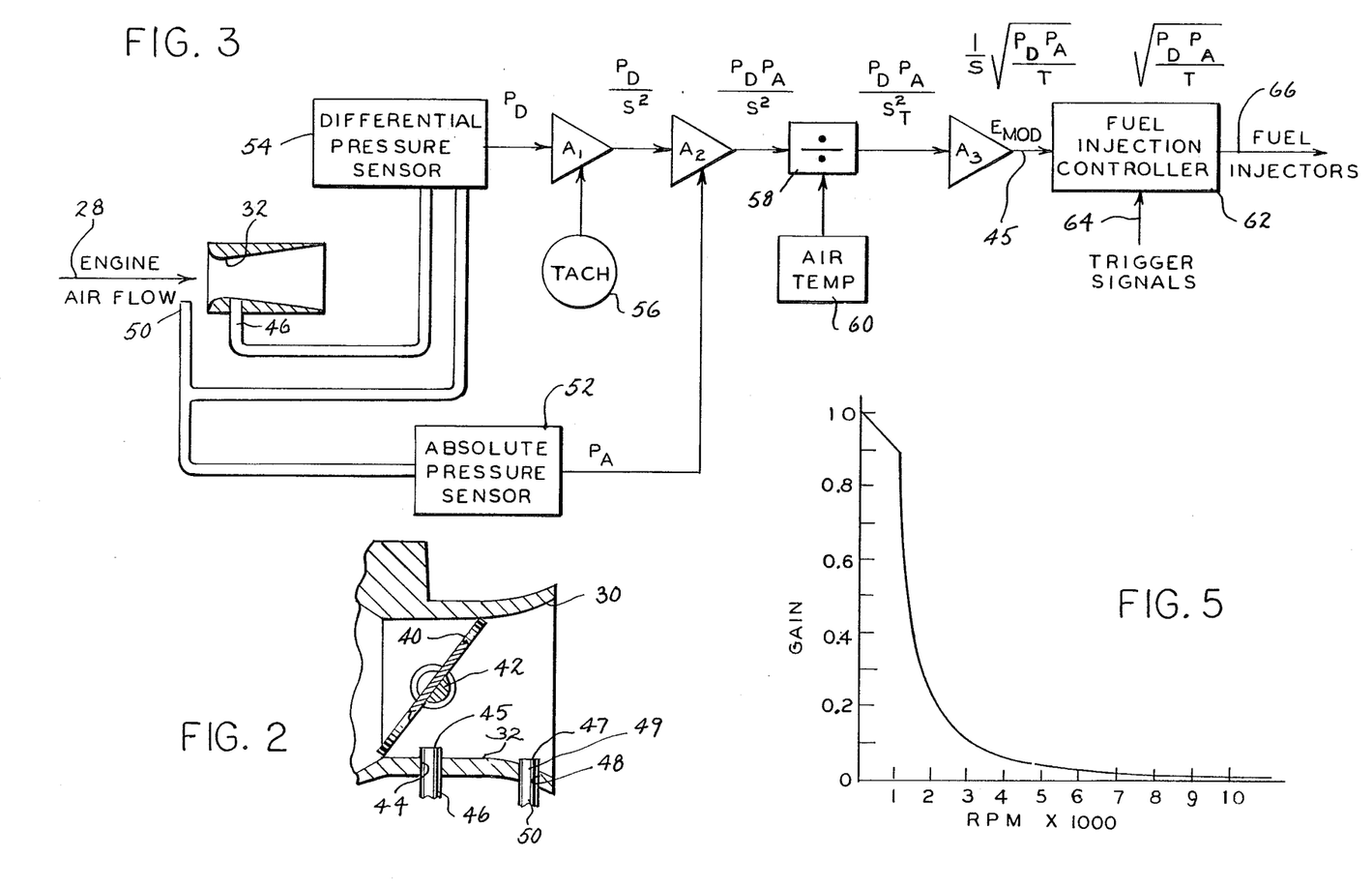
FIG. 2 is a sectional view through a portion of the structure of FIG. 1.
FIG. 3 is a schematic block diagram of electronic control circuitry in accordance with the invention.
FIG. 5 is a graph illustrating operation of a portion of the circuitry of FIG. 4.

As noted, venturi 32 in air intake manifold 24 produces a pressure drop. Absolute pressure sensor 52, FIG. 3, for example a Microswitch 136PC, measures absolute air pressure $P_A$ outside of venturi 32 at tube 50. Differential pressure sensor 54, for example a Microswitch 176PC, measures the differential pressure $P_D$ between the absolute pressure outside of the venturi at tube 50 and the reduced pressure in the venturi at tube 46. Engine speed S measured by tachometer 56 is squared by amplifier A1 and also divided by amplifier A1 into $P_D$, and the result is multiplied by $P_A$ at amplifier A2, which result is divided at 58 by air temperature T from temperature sensor 60. Amplifier A3 performs a square root function whose output is the signal $E_{MOD}$ on line 45 in FIG. 11 of incorporated U.S. Pat. No. 4,305,351. The signal $E_{MOD}$ is supplied to the fuel injection controller 62 provided by the one or more square wave pulse generators in FIG. 11 of incorporated U.S. Pat. No. 4,305,351, which are triggered by one or more ignition pulses shown as FIRE CYL. #1 and FIRE CYL. #4 in FIG. 11 of incorporated U.S. Pat. No. 4,305,351. These ignition pulses provide the trigger signals on line 64, FIG. 3, to the fuel injection controller which in turn outputs injection pulses on line 66 to the fuel injectors, as shown at the one or more lines 48, 49 in FIG. 11 of incorporated U.S. Pat. No. 4,305,351. The length of the injection pulses on line 66, FIG. 3, is determined by $\sqrt{P_D P_A/T}$. $\sqrt{P_D}$ measures air flow velocity. $\sqrt{P_A/T}$ measures air mass. The frequency of the ignition or trigger signals on line 64 corresponds to engine speed and hence cancels out the factor 1/S in the $E_{MOD}$ signal.

The differential pressure $P_D$ varies over a wide range, from a minimum at idle speed to a maximum at high engine speed. The low end signal may be too small for the amplifier unless an inordinate amount of gain is provided. On the other hand, the high end signal may saturate the amplifier unless the gain is reduced. These factors limit the dynamic range. One solution is to provide a greater pressure drop by further reducing the constriction of the venturi. However, it is not desirable to reduce the constriction of the venturi too much because this would hinder air flow and reduce power, etc. In the preferred embodiment, the inner diameter at mouth 30 is about five inches and the inner diameter at venturi 32 is about three inches. The dynamic range dilemma is solved by reducing the differential pressure signal as engine speed increases. The amplifier can thus be provided with enough gain to amplify the low end signals at idle speed, and yet not saturate at high speed. $P_D$ is reduced by a factor of $S^2$.

Figure 4:
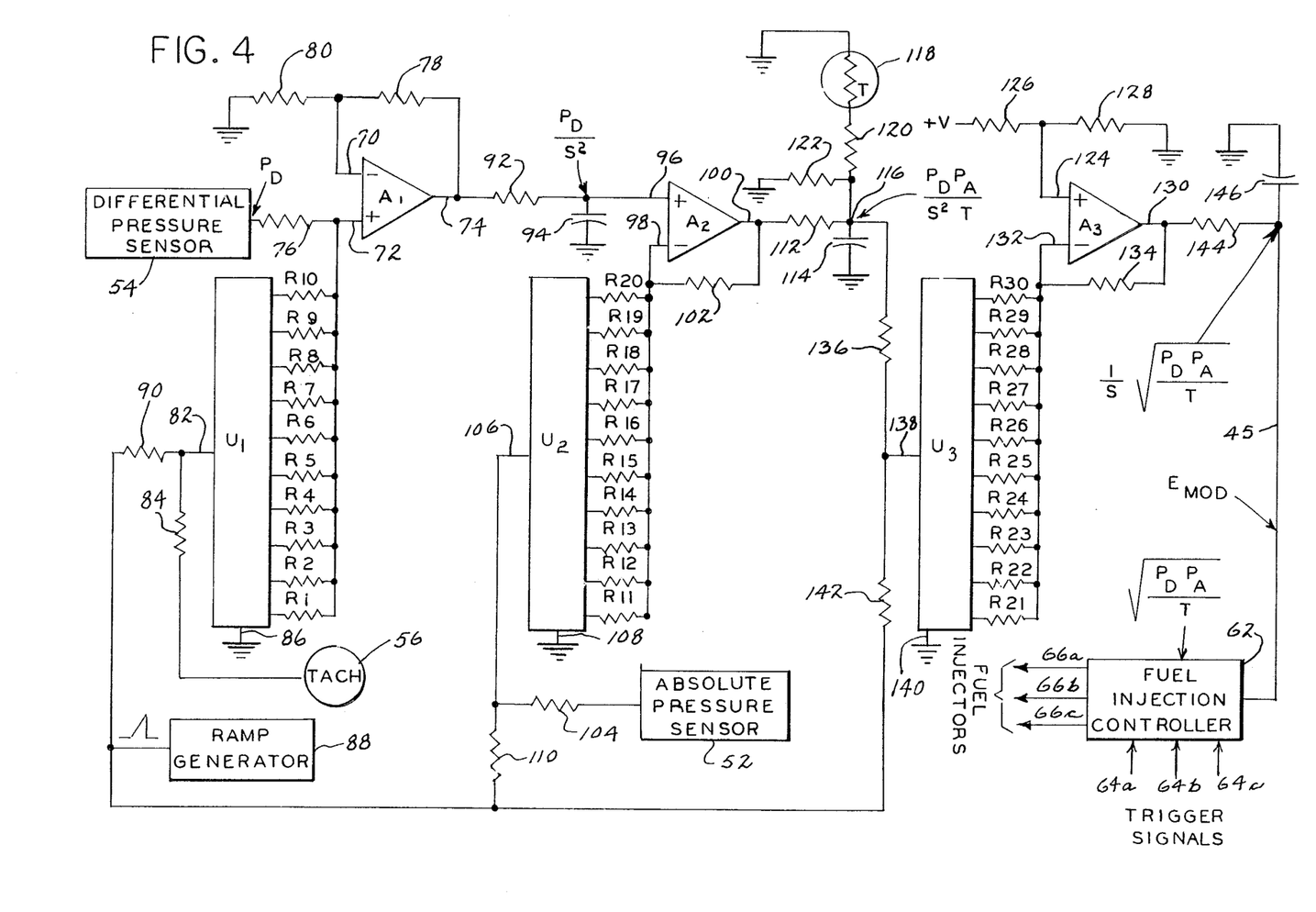
FIG. 4 is a more detailed circuit diagram of the circuitry of FIG. 3.

Referring to FIG. 4, amplifier A1 has an inverting input 70, a noninverting input 72 and an output 74. The output of differential pressure sensor 54 is connected through resistor 76 to input 72 of amplifier A1. The output 74 of amplifier A1 is connected in a voltage divider network formed by resistors 78 and 80 in a feedback loop to input 70 to set the gain of amplifier A1. An LEO chip driver U1, for example an LM3914, has an input 82 from tachometer 56 through resistor 84, and has a plurality of outputs including respective resistors R1–R10 connected in parallel to input 72 of amplifier A1. As engine speed increases, the voltage at U1 input 82 from tachometer 56 increases, which in turn sequentially turns on resistors R1 through R10 in stepwise manner. When the first output turns on, resistor R1 is connected in circuit with amplifier input 72 such that current flows from input 72 through resistor R1 to ground reference at 86. This sinking of current through resistor R1 from input 72 lowers the voltage at input 72 which in turn reduces the voltage at amplifier output 74 because less gain is needed to keep the voltage at input 70 equal to that at input 72. As engine speed continues to increase, the voltage at U1 input 82 increases, and when it reaches the next threshold, the output at R2 is turned on to also connect resistor R2 in circuit with amplifier input 72 such that additional current flows from input 72 through resistor R2 to ground reference at 86, thus further lowering the voltage at amplifier input 72 and hence lowering the voltage at amplifier output 74. As engine speed continues to increase, the voltage at input 82 increases, and the remaining resistors R3 through R10 are sequentially turned on.

The values of resistances R1 through R10 are chosen to provide the noted quadradic squaring and division function to yield $P_D/S^2$. In FIG. 4, the resistance values for resistors R1–R10 are, respectively: 909K ohms; 30.1K ohms; 17.8K ohms; 12.7K ohms; 10.0K ohms; 8.06K ohms; 6.81K ohms; 5.90K ohms; 5.23K ohms; and 4.64K ohms. FIG. 5 shows a graph of relative gain of amplifier A1 for the output signal at 74 versus engine speed, and illustrates the decreasing quadradic relationship with increasing engine speed. The smooth nature of the curve is facilitated by ramp generator 88 providing a superimposed ramp voltage through resistor 90 to U1 input 82 which periodically rises to a maximum voltage level about 1/10th that of the maximum tachometer voltage. Ramp generator 88 is an RC oscillator running at a substantially higher frequency, e.g. 100 hertz, than the progression of threshold steps of U1, i.e. the ramp generator will go through many cycles between each of the threshold steps for turning on R1 through R10. The superimposed oscillatory higher frequency ramp voltage provides a small ripple in the voltage at input 82 which provides a more gradual turning-on of the next threshold step, rather than an abrupt turn-on of the next resistance, and hence smooths out the otherwise stepwise incrementation of voltage at amplifier input 72, and provides a more smoothly varying variable resistance attenuator. Resistor 92 and capacitor 94 provide an RC filter filtering out the ramp generator frequency at the output of amplifier A1.

Amplifier A2 has a noninverting input 96 receiving the signal $P_D/S_2$, an inverting input 98 and an output 100. Output 100 is connected to input 98 in a feedback loop including a voltage divider network formed by resistor 102 and parallel resistors R11-R20 in the outputs of LED chip driver U2, such as an LM3914. Absolute pressure sensor 52 is connected through resistor 104 to U2 input 106. As the absolute air pressure increases, the increasing voltage at U2 input 106 sequentially turns on resistors R11-R20 in stepwise manner as the various switching thresholds are reached. As more outputs of U2 are turned on, more resistors are connected in parallel between amplifier input 98 and ground reference 108, which in turn sinks more current through the respective resistors from amplifier input 98, thus lowering the voltage at input 98. The lower voltage at amplifier input 98 causes the voltage at amplifier output 108 to increase because such increased gain is necessary to maintain the voltage at input 98 equal to that at amplifier input 96.

The values of resistances R11-R20 are chosen to provide a linear multiplying function, in order to multiply $P_D/S_2$ by $P_A$. Resistors R11-R20 each have the same resistance, 100K ohms. The voltage from ramp generator 88 is applied through resistor 110 to be superimposed and added to the voltage at U2 input 106 smooth out the stepwise changing of resistance at the outputs of U2, in order to provide a smoother change. The ramp generator frequency is later filtered out at the RC filter provided by resistor 112 and capacitor 114 at the output of amplifier A2.

The divider function 58 of FIG. 3 is provided at node 116 in FIG. 4. Temperature sensor 60 is a negative temperature coefficient thermistor 118 connected between node 116 and ground reference, and physically located at inlet mouth 30 to sense ambient air temperature. A resistor 120 is connected in series between node 116 and NTC thermistor 118, and a resistor 122 is connected in parallel with NTC thermistor 118 between node 116 and ground reference. As temperature increases, the resistance of NTC thermistor 118 decreases, and more current is conducted therethrough from node 116, which in turn lowers the voltage at node 116, providing the divide by T function. Resistor 120 has a substantially lower resistance value than resistor 122. At low temperature, the resistance value of thermistor 118 is high, and most of the current from node 116 flows through resistor 122. At high temperature, the resistance valve of thermistor 118 is low, and most of the current from node 116 flows through resistor 120 and thermistor 118, because such branch provides the lower resistance path at high temperature. Resistors 122 and 120 have a ratio of about a 100 to 1 and tend to linearize the response of thermistor 118, to provide a more linear divide by T function, such that the output voltage from amplifier A2 is more linearly reduced with increasing temperature.

Amplifier A3 has a noninverting input 124 connected to a voltage source $+V$ through a voltage divider network formed by resistors 126 and 128. Amplifier A3 has an output 130 connected to noninverting input 132 in a feedback loop including the voltage divider network formed by resistor 134 and resistors R21-R30 which are connected to respective parallel outputs of LED chip driver U3, such as an LM3914. The voltage at node 116, representing $P_DP_A/S_2$, is supplied through resistor 136 to the input 138 of U3. As the voltage at input 138 increases, the outputs of U3 are sequentially turned on in stepwise manner, to connect more resistors to amplifier input 132, to in turn sink more current through the respective parallel resistors from amplifier input 132 to ground reference 140, to lower the voltage at amplifier input 132. The lower voltage at amplifier input 132 causes an increased voltage at amplifier output 130 because more gain is needed to keep the voltage at input 132 equal to that at input 124.

The values of resistances R21-R30 are chosen to provide the square root function and are respectively: 383K ohms; 191K ohms; 249K ohms; 294K ohms; 332K ohms; 374K ohms; 402K ohms; 432K ohms; 475K ohms; and 487K ohm. Oscillatory ramp voltage from ramp generator 88 through resistor 142 is superimposed and added at input 138 to smooth out the step changes as the switching thresholds are reached for turn-on of the outputs having resistors R21 through R30. The ramp voltage frequency is later filtered out by the RC filter formed by resistor 144 and capacitor 146.

The output of amplifier A3 provides the $E_{MOD}$ signal on line 45 which is the $E_{MOD}$ signal on line 45 in FIG. 11 of incorporated U.S. Pat. No. 4,305,351. FIG. 11 of incorporated U.S. Pat. No. 4,305,351 shows two square wave pulse generators 46 and 47 in accordance with the timing system in FIG. 5 thereof. In the present invention, the timing system in FIG. 6 of incorporated U.S. Pat. No. 4,305,351 is preferred, with three square wave pulse generators each of which is supplied with the $E_{MOD}$ signal, and each of which receives its respective injection trigger signal 64a, 64b, 64c provided by the respective ignition pulses indicated as FIRE #1, FIRE #3 and FIRE #5 in FIG. 6 of incorporated U.S. Pat. No. 4,305,351. Likewise, instead of two output injection pulses shown as 48 and 49 in FIG. 11 of incorporated U.S. Pat. No. 4,305,351, the present system includes three output injection pulses 66a, 66b, 66c respectively providing INJECT #3, 4, INJECT #5, 6, INJECT #1, 2 in FIG. 6 of incorporated U.S. Pat. No. 4,305,351. The frequency of the ignition trigger pulses corresponds to engine speed and hence cancels the term 1/S in the $E_{MOD}$ signal. The square wave generators are triggered by the ignition trigger signals, and the length of the injection pulses output therefrom equals $k\sqrt{P_DP_A/T}$, where k is a constant.

The square root generator function provided by A3 and U3 includes a failsafe region in the event differential pressure sensor 54 fails or the voltage at U3 input 138 drops to zero. Even with a zero input at 118, it is still desired that a certain level voltage output be generated at the amplifier output on line 45 so that there will be at least some fuel injection pulse length generated in order to inject enough fuel to keep the engine running and at least get home, albeit not at peak power. This minimum fuel supply is considered desirable and provides a limp home feature so that the boat operator will not be stranded in the middle of the lake. Amplifier A3 is thus preferably provided with a minimum gain even if each of the U3 outputs through respective resistors R21-R30 is nonconductive, which gain is set by resistor 114. Because of this gain, the value of resistance R21 is selected out of sequence with the other resistances R22-R30, as above noted.

The invention is preferably implemented in analog circuitry, as disclosed above, though it can also be implemented by digital circuitry including a microprocessor. Analog circuitry is preferred because of its better noise immunity. For example, an ignition spike in an analog system may cause a momentary purturbation, but the system will keep running. In a digital system, such ignition spike may fill or lock-up a register such that the next component gets the wrong operational code, and the system may shut down. Marine racing applications involve high speeds and extremely noisy environments, and hence the analog circuitry is desirable. If digital or microprocessor circuitry is used, it is still preferred that the interfacing of the differential pressure sensor be done after the sensor's analog output is reduced with increasing engine speed, to improve the sensor's dynamic range.

It is thus seen that a mass flow fuel injection control system is provided for an internal combustion engine having air intake means supplying combustion air to the engine, and fuel injector means supplying fuel to the engine. Flow velocity of the combustion air is determined by measuring $P_D$ and calculating $\sqrt{P_D}$. Air mass is determined by measuring $P_A$ and T and calculating $\sqrt{P_A/T}$. The circuitry responds to the measured $P_D$, $P_A$ and T to control the amount of fuel injected according to air flow velocity and air mass as calculated by $\sqrt{P_D P_A/T}$.

It is recognized that various equivalents, alternatives and modifications are possible within the scope of the appended claims.

I claim:

1. A mass flow fuel injection control system for an internal combustion engine having air intake means supplying combustion air to said engine, and fuel injector means supplying fuel to said engine, comprising:
   air flow velocity sensing means comprising venturi means in said air intake means producing a pressure drop, and means measuring the differential pressure $P_D$ between the absolute pressure outside of said venturi means and the reduced pressure in said venturi means, and means calculating said air flow velocity as a function of $P_D$;
   means sensing the mass of said combustion air comprising means measuring the absolute air pressure $P_A$ outside of said venturi means and temperature sensor means measuring air temperature T, and said calculating said air mass as a function of $P_A$ and T;
   means responsive to said air flow velocity sensor means and said air mass sensor means and controlling said fuel injector means;
   tachometer means for measuring engine speed S, and variable resistance attenuator means responsive to siad tachometer means and connected to said air flow velocity sensing means and changing resistance with increasing engine speed such that said air flow velocity sensing means divides $P_D$ by a given power of S.

2. A mass flow fuel injection control system for an internal combustion engine having air intake means supplying combustion air to said engine, and fuel injector means supplying fuel to said engine, comprising:
   venturi means in said air intake means and producing an air pressure drop;
   absolute pressure sensor means measuring absolute pressure $P_A$ outside of said venturi means;
   differential pressure sensor means measuring the differential pressure $P_D$ between the absolute pressure outside of said venturi means and the reduced pressure in said venturi means;
   temperature sensor means measuring air temperature T;
   tachometer means measuring engine speed S;
   squaring and divider means dividing $P_D$ by $S^2$;
   multiplier means multiplying $P_D/S^2$ by $P_A$;
   divider means dividing $P_D P_A/S^2$ by T;
   square root means providing the square root of $P_D P_A/S^2 T$;
   means supplying injection pulses for said fuel injector means in response to trigger signals to control the amount of fuel injected, wherein the length of said injection pulses is determined by $1/S \sqrt{P_D P_A/T}$ times the frequency of said trigger signals.

3. A mass flow fuel injection control system for an internal combustion engine having air intake means supplying combustion air to said engine, and fuel injector means supplying fuel to said engine, comprising:
   air flow velocity sensing means comprising venturi means in said air intake means producing a pressure dip, and means measuring the differential pressure $P_D$ between the absolute pressure outside of said venturi means and the reduced pressure in said venturi means, and means calculating said air flow velocity as a function of $P_D$;
   means sensing the mass of said combustion air comprising means measuring the absolute air pressure $P_A$ outside of said venturi means and temperature sensor means measuring air temperature T, and means calculating said air mass as a function of $P_A$ and T;
   means responsive to said air flow velocity sensor means and said air mass sensor means and controlling said fuel injector means
   wherein said air flow velocity sensing means measures $P_D$ and calculates $\sqrt{P_D}$ to determined said air flow velocity;
   said air mass sensing means measures $P_A$ and T and calculates $\sqrt{P_A/T}$ to determine said air mass;
   said means controlling said fuel injector means comprises means supplying injection pulses for said fuel injector means to control the amount of fuel injected, wherein the length of said injection pulses is controlled by $\sqrt{P_D}$ and by $\sqrt{P_A/T}$.

4. The invention according to claim 3 wherein said air flow velocity and air mass are used to control the amount of fuel injected without determination from a preprogrammed look-up table according to throttle setting, eliminating the need for a throttle position sensor for controlling said fuel injection.

5. A mass flow fuel injection control system for an internal combustion engine having air intake means supplying combustion air to said engine, and fuel injector means suppling fuel to said engine, comprising:
   venturi means in said air intake means producing a pressure drop;
   absolute pressure sensor means measuring absolute air pressure $P_A$ outside of said venturi means;
   differential pressure sensor means measuring the differential pressure $P_D$ between the absolute pressure outside of said venturi means and the reduced pressure in said venturi means;
   temperature sensor means meausring air temperature T;
   means supplying injection pulses for said fuel injector means to control the amount of fuel injected, wherein the length of said injector pulses is a factor of $\sqrt{P_D P_A/T}$,
   means for multiplying $P_D$ by $P_A$ comprising:

amplifier means having first and second inputs, and an output, said first input of said amplifier means being responsive to $P_D$, said output of said amplifier means being connected in a voltage divider network in a feedback loop to said second input of said amplifier means;

chip driver means having a plurality of outputs connected in parallel to said second input of said amplifier means, each output having a given resistance, said chip driver means having an input responsive to said absolute pressure sensor means to successively turn on more of said outputs as said absolute pressure increases, to in turn connect more of said resistance to said second input of said amplifier means, has gain of said amplifier means being variable and determined according to the number of said outputs and their resistances connected to said second input of said amplfieir means, wherein a turned-on output of said chip driver means completes a circuit through its respective resistance from said second input of said amplifier means to a given ground reference, such that current flows from said second input of said amplfier means through said respective resistance to said ground reference to reduce the voltage at said second input of said amplifier means, such that as more of said outputs of said chip driver means are turned on, more of said respective resistances are connected to said second input of said amplfier means to in turn reduce the voltage thereat and in turn increase the gain of said amplifier means to increase the voltage level at the output of said amplifier means with increasing $P_A$, to in turn multiply $P_D$ by $P_A$.

6. The invention according to claim 5 wherein each of said resistances at the respective said outputs of said chip driver means has about the same value.

7. The invention according to claim 6 comprising ramp generator means supplying a periodic ramp voltage at said input of said chip driver means at a given frequency to smooth the transitions of the switching of said chip driver means outputs and provide a more gradual transitioning betwen said resistances and in turn a smoother increase of the voltage level at the output of said amplifier means with increasing $P_A$.

8. A mass flow fuel injection control system for an internal combustion engine having air intake means supplying combustion air to said engine, and fuel injector means supplying fuel to said engine, comprising:
venturi means in said air intake means producing a pressure drop;
absolute pressure sensor means measuring absolute air pressure $P_A$ outside of said venturi means;
differential pressure sensor means measuring the differential pressure $P_D$ between the absolute pressure outside of said venturi means and the reduced pressure in said venturi means;
temperature sensor means measuring air temperature T;
means supplying injection pulses for said fuel injector means to control the amount of fuel injected, wherein the length of said injection pulses is a factor of $\sqrt{P_D P_A/T}$;
means for multiplying $P_D$ by $P_A$ and supplying the product as an analog voltage level at a given node;
means for dividing $P_D P_A$ by T.

9. The invention according to claim 8 wherein said last mentioned means comprises a thermistor connected in circuit with said node.

10. The invention according to claim 9 wherein said thermistor comprises a negative temperature coefficient thermistor connected between said node and a ground reference such that with increasing temperature the resistance of said thermistor decreases and more current flows therethrough from said node to said ground reference, thus reducing the voltage at said node to provide said divide by T function.

11. The invention according to claim 10 comprising a first resistor connected in series with said thermistor, and a second resistor connected in parallel with said thermistor between said node and said ground reference, said first resistor having a smaller valve than said second resistor such that at low temperature and high resistance of said thermistor more current flows through said second resistor, and such that at high temperature and low resistance of said thermistor more current flows through said first resistor and said thermistor, to linearize the changing voltage value at said node as a function of T.

12. A mass flow fuel injection control system for an internal combustion engine having air intake means supplying combustion air to said engine, and fuel injector means supplying fuel to said engine, comprising:
venturi means in said air intake means producing a pressure drop;
absolute pressure sensor means measuring absolute air pressure $P_A$ outside of said venturi means;
differential pressure sensor means measuring the differential pressure $P_D$ between the absolute pressure outside of said venturi means and the reduced pressure in said venturi means;
temperature sensor means measuring air temperature T;
means supplying injection pulses for said fuel injector means to control the amount of fuel injected, wherein the length of said injection pulses is a factor of $\sqrt{P_D P_A/T}$;
means providing $P_D P_A/T$ as an analog voltage at a given node;
means providing $\sqrt{P_D P_A/T}$.

13. The invention according to claim 12 wherein said last mentioned means comprises:
amplifier means having first and second inputs, and an output;
chip driver means having an input connected to said node and having a plurality of outputs connected in parallel to one of said inputs of said amplifier means, each output having a given resistance, said input of said chip driver means being responsive to voltage at said node to successively turn-on more of said outputs of said chip driver means as $P_D P_A/T$ changes, to in turn connect more of said resistances to said one input of said amplifier means, the gain of said amplifier means being variable and determined according to the number of said chip driver means outputs and their resistances connected to said one input of said amplifier means, wherein a turned-on output of said chip driver means completes a circuit through its respective resistance from said one input of said amplifier means to a given ground reference, such that current flows from said one input of said amplifier means through said respective resistance to said ground reference to reduce the voltage at said one input of said amplifier means and in turn reduce the voltage at said output of said amplifier means, such that as more of said outputs of said chip driver means are turned on, more of said respective resistances are connected to said one input of said amplifier means to in turn reduce the voltage thereat and in turn increase the gain of said amplifier means to increase the voltage at said output of said amplifier means, wherein the values of said resistances in said parallel outputs of said chip driver means are selected such that the output of said amplifier means changes as the one-half power of the voltage at said node, to provide the function of $\sqrt{P_D P_A/T}$.

14. The invention according to claim 14 wherein the other said input of said amplifier means is connected to a given reference voltage, and wherein said output of said amplifier means is connected in a voltage divider network in a feedback loop to said one input of said amplifier means.

15. The invention according to claim 14 comprising ramp generator means for supplying a periodic ramp voltage at said input of said chip driver means at a given frequency to smooth the transitions of the switching of said chip driver means outputs and provide a more gradual transitioning between said chip driver means output resistances and in turn a smoother change of the voltage level at said output of said amplifier means.

16. A mass flow fuel injection control system for an internal combustion engine having air intake means supplying combustion air to said engine, and fuel injector means supplying fuel to said engine, comprising:
venturi means in said air intake means producing a pressure drop;
absolute pressure sensor means measuring absolute air pressure $P_A$ outside of said venturi means;
differential pressure sensor means measuring the differential pressure $P_D$ between the absolute pressure outside of said venturi means and the reduced pressure in said venturi means;
temperature sensor means measuring air temperature T;
means supplying injection pulses for said fuel injector means to control the amount of fuel injected, wherein the length of said injection pulses is a factor of $\sqrt{P_D P_A/T}$,
wherein $P_D$ varies from a low value at idle speed of said engine to a high value at top speed of said engine, and comprising:
amplifier means responsive to said differential pressure sensor means and yielding an amplified $P_D$ output;
means for increasing the dynamic range of said control system by preventing saturation of said amplifier means over said $P_D$ range by reducing said amplified $P_D$ output with increasng engine speed.

17. The invention according to claim 16 comprising tachometer means for measuring engine speed S, and wherein said amplifier menas divides $P_D$ by $S^2$.

18. The invention according to claim 17 comprising chip driver means having a plurality of outputs connected in parallel to said amplifier means, each output having a given resistance, said chip driver means having an input responsive to said tachometer means to successively turn on more of said outputs with increasing engine speed to in turn connect more of said resistances in circuit with said amplifier means, wherein the values of said resistances are selected to provide an output of said amplifier means as a nonlinear decreasing quadradic function of S to provide the function $P_D/S^2$.

19. The invention according to claim 18 wherein said amplifier means has first and second inputs, and has an output connected in a voltage divider feedback network to said first input to set the gain of said amplifier means, and wherein the output of said differential pressure sensor means and the parallel outputs including said resistances of said chip driver means are connected to said second input of said amplifier means.

20. The invention according to claim 19 wherein the gain of said amplifier means is fixed as set by said voltage divider network in said feedback loop to said first input of said amplifier means, and wherein said chip driver means turns on said outputs according to given threshold speeds from said tachometer means, wherein a turned-on output of said chip driver means completes a circuit through its respective resistance means from said second input of said amplifier means to a given ground reference, such that current flows from said second input of said amplifier means through said respective resistance means to said ground reference to reduce the voltage at said second input of said amplifier means and in turn reduce the voltage level at said output of said amplifier means, because less gain of said amplifier means is needed to keep the voltage at said first input of said amplifier means equal to that at said second input of said amplifier means.

21. The invention according to claim 20 comprising ramp generator means supplying a periodic ramp voltage at said input of said chip driver means at a given frequency to smooth the transitions of the switching of said chip driver means outputs and provide a more gradual transitioning between said resistances and in turn a smoother reduction of the voltage level at said output of said amplifier means with increasing engine speed.

22. The invention according to claim 16 comprising tachometer means for measuring engine speed S, and variable resistance attenuator means responsive to said tachometer means and connected to said amplifier means and changing resistance with increasing engine speed such that said amplifier means divides $P_D$ by a given power of S.

23. The invention according to claim 22 wherein:
said squaring and divider means comprises:
first variable resistance attenuator means responsive to said tachometer means; and
first amplifier means responsive to said first variable resistance attenuator means and to said differential pressure sensor means; said multiplier means comprises:
second variable resistance attenuator means responsive to said absolute pressure sensor means; and
second amplifier means responsive to said second variable resistance attenuator means and to said first amplifier means; said square root means comprises:
third variable resistance attenuator means responsive to said second amplifier means; and
third amplifier means responsive to said third variable resistance attenuator means.

24. The invention according to claim 23 wherein:
said squaring and divider means comprises first chip driver means having a plurality of outputs connected in parallel to said first amplifier means, each output having a given resistance, said first chip driver means having an input responsive to said tachometer means to successively turn on more of said outputs with increasing engine speed to in turn connect more of said resistances in circuit with said first amplifier means, wherein the values of said resistances are selected to provide an output of said first amplifier means as a nonlinear decreasing quadradic function of S to provide the function $P_D/S^2$;

said multiplier means comprises second chip driver means having a plurality of outputs connected in parallel to said second amplifier means, each output having a given resistance, said second chip driver means having an input responsive to said absolute pressure sensor means to successively turn on more of said outputs of said second chip driver means as said absolute pressure increases, to in turn connect more of said resistances of said second chip driver means to said second amplifier means, wherein the values of said resistances of said second chip driver means are selected to provide an output of said second amplifier means as an increasing function of $P_D/S^2$ to provide the function $P_DP_A/S^2$;

said divider means comprises temperature responsive means in circuit with the output of said second amplifier means;

said square root means comprises third chip driver means having a plurality of outputs connected in parallel with said third amplifier means, each output having a given resistance, said third chip driver means having an input responsive to said output of said second amplifier means to successively turn on more of said outputs of said third chip driver means with increasing $P_DP_A/S^2T$ to in turn connect more of said resistances of said third chip driver means in circuit with said third amplifier means, wherein the values of said resistances of said third chip driver means are selected to provide an output of said third amplifier means as the one-half power of the voltage at said input of said third chip driver means to provide the function $1/S \sqrt{P_DP_A/T}$.

25. The invention according to claim 24 wherein:

said first amplifier means has first and second inputs, and has an output connected in a voltage divider feedback network to said first input of said first amplifier means to set the gain of said first amplifier means;

the output of said differential pressure sensor means and the parallel outputs including said resistances of said first chip driver means are connected to said second input of said first amplifier means;

said first chip driver means successively turns on said outputs according to given threshold speeds from said tachometer means, wherein a turned-on output of said first chip driver means completes a circuit through its respective resistance from said second input of said first amplifier means to a given ground reference such that current flows from said second input of said first amplifier means through said respective resistance to said ground reference to reduce the voltage at said second input of said first amplifier means and in turn reduce the voltage level at said output of said first amplifier means because less gain is needed to keep the voltage at said first input of said first amplifier means equal to that at said second input of said first amplifier means;

said second amplifier means has first and second inputs, and an output, said first input of said second amplifier means being responsive to said first amplifier means; said output of said second amplifier means being connected in a voltage divider network in a feedback loop to said second input of said second amplifier means;

said second chip driver means has said plurality of outputs connected in parallel to said second input of said second amplifier means, said input of said second chip driver means being responsive to said absolute pressure sensor means to successively turn on more of said outputs of said second chip driver means as said absolute pressure increases, to in turn connect more of said resistances of said second chip driver means to said second input of said second amplifier means, the gain of said second amplifier means being variable and determined according to the number of said outputs and their resistances of said second chip driver means connected to said input of said second amplifier means, wherein a turned-on output of said second chip driver means completes a circuit through its respective resistance from said second input of said second amplifier means to a given ground reference, such that current flows from said second input of said second amplifier means through said respective resistance to said ground reference to reduce the voltage at said second input of said second amplifier means, such that as more of said outputs of said second chip driver means are turned on, more of said respective resistances are connected to said second input of said second amplifier means to in turn reduce the voltage thereat and in turn increase the gain of said second amplifier means to increase the voltage level at said output of said second amplifier means with increasing $P_A$, to in turn multiply $P_D/S^2$ by $P_A$;

said third amplifier means has first and second inputs, and an output;

said third chip driver means has an input connected to said output of said second amplifier means and has a plurality of outputs connected in parallel to one of said inputs of said third amplifier means, said input of said third chip driver means being responsive to voltage at said output of said second amplifier means to successively turn-on more of said outputs of said third chip driver means as $P_DP_A/S^2T$ increases, to in turn connect more of said respective resistances to said one input of said third amplifier means, the gain of said third amplifier means being variable and determined according to the number of said third chip driver means outputs and their resistances connected to said one input of said third amplifier means, wherein a turned-on output of said third chip driver means completes a circuit through its respective resistance from said one input of said third amplifier means to a given ground reference, such that current flows from said one input of said third amplifier means through said respective resistance to said ground reference to reduce the voltage at said one input of said third amplifier means and in turn reduce the voltage of said output of said third amplifier means, such that as more of said outputs of said third chip driver means are turned on, more of said respective resistances are connected to said one input of said third amplifier means to in turn reduce the voltage thereat and in turn increase the gain of said third amplifier means to increase the voltage at said output of said third amplifier means, wherein the values of said resistances in said parallel outputs of said third chip driver means are selected such that the output of said amplifier means changes as the one-half power of the voltage at said input of said third chip driver means, to provide the function $1/S \sqrt{P_D P_A / T}$.

26. The invention according to claim 25 wherein said temperature responsive means connected in circuit with said output of said second amplifier means comprises a negative temperature coefficient thermistor connected between a ground reference and a node connected in circuit with said output of said second amplifier means, such that with increasing temperature the resistance of said thermistor decreases and more current flows therethrough from said node to said ground reference, thus reducing the voltage at said node to provide said divide by T function.

27. The invention according to claim 25 comprising ramp generator means supplying a periodic ramp voltage at each of said inputs of said first, second and third chip driver means at a given frequency to smooth the transitions of the switching of said outputs of said first, second and third chip driver means and provide a more gradual transitioning between said resistances and in turn a smoother change of the voltage level at respective said outputs of said first, second and third amplifier means.

* * * * *

UNITED STATES PATENT AND TRADEMARK OFFICE
CERTIFICATE OF CORRECTION

PATENT NO. : 4,750,464

DATED : June 14, 1988

INVENTOR(S) : RICHARD E. STAERZL

It is certified that error appears in the above-identified patent and that said Letters Patent is hereby corrected as shown below:

Col. 1, line 52, delete "overcome" and substitute therefor --overcomes--; Col. 3, line 55, delete "iniection" and substitute therefor --injection--; Col. 4, line 19, delete "LEO" and substitute therefor --LED--; Col. 5, line 6, delete "$P_D/S_2$" and substitute therefor --$P_D/S^2$--; Col. 5, line 27, delete "$P_D/S_2$" and substitute therefor --$P_D/S^2$--; Col. 6, line 2, delete "$P_D P_A/S_2$" and substitute therefor --$P_D P_A/S^2$--; Col. 7, line 23, after "measured" insert --values--; Col. 7, line 45, Claim 1, delete "said" and substitute therefor --means--; Col. 8, line 5, Claim 2, delete "$S_2$" and substitute therefor --$S^2$--; Col. 8, line 20, Claim 3, delete "dip" and substitute therefor --drop--; Col. 8, line 62, Claim 5, delete "meausring" and substitute therefor --measuring--; Col. 8, line 66, Claim 5, delete "injector" and substitute therefor --injection--; Col. 9, line 14, Claim 5, delete "resistance" and substitute therefor

UNITED STATES PATENT AND TRADEMARK OFFICE
CERTIFICATE OF CORRECTION

PATENT NO. : 4,750,464

DATED : June 14, 1988

INVENTOR(S) : RICHARD E. STAERZL

It is certified that error appears in the above-identified patent and that said Letters Patent is hereby corrected as shown below:

--resistances--; Col. 9, line 15, Claim 5, delete "has" and substitute therefor --the--; Col. 9, line 23, Claim 5, delete "amplfier" and substitute therefor --amplifier--; Col. 9, line 29, Claim 5, delete "amplfier" and substitute therefor --amplifier--; Col. 11, line 11, Claim 14, delete "14" and substitute therefor --13--; Col. 11, lines 50-51, Claim 16, delete "amplfier" and substitute therefor --amplifier--; Col. 11, line 55, claim 17, delete "menas" and substitute therefor --means--.

Signed and Sealed this

Twenty-fifth Day of April, 1989

Attest:

DONALD J. QUIGG

Attesting Officer

Commissioner of Patents and Trademarks